United States Patent
McConnell

(10) Patent No.: US 11,845,233 B1
(45) Date of Patent: Dec. 19, 2023

(54) PRECISION TOW IMPREGNATION MANUFACTURING SYSTEM

(71) Applicant: Keith McConnell, San Diego, CA (US)

(72) Inventor: Keith McConnell, San Diego, CA (US)

( * ) Notice: Subject to any disclaimer, the term of this patent is extended or adjusted under 35 U.S.C. 154(b) by 419 days.

(21) Appl. No.: 16/992,235

(22) Filed: Aug. 13, 2020

Related U.S. Application Data

(60) Provisional application No. 62/886,003, filed on Aug. 13, 2019.

(51) Int. Cl.
*B29C 70/52* (2006.01)
*B29C 70/38* (2006.01)

(52) U.S. Cl.
CPC .......... *B29C 70/526* (2013.01); *B29C 70/521* (2013.01); *B29C 70/528* (2013.01); *B29C 70/382* (2013.01); *B29C 70/386* (2013.01)

(58) Field of Classification Search
CPC ... B29C 70/526; B29C 70/521; B29C 70/528; B29C 70/382; B29C 70/386; B29C 70/504; B29C 70/527
See application file for complete search history.

(56) References Cited

U.S. PATENT DOCUMENTS

| | | | |
|---|---|---|---|
| 3,971,669 A | 7/1976 | Wrzesien et al. | |
| 4,559,005 A * | 12/1985 | Gants | B29D 99/0017 425/363 |
| 4,804,509 A | 2/1989 | Angell, Jr. et al. | |
| 5,024,978 A | 6/1991 | Allaire et al. | |
| 5,397,523 A | 3/1995 | Curry | |
| 5,409,757 A | 4/1995 | Muzzy et al. | |
| 5,747,075 A * | 5/1998 | Gauchel | B29C 70/525 156/433 |
| 6,500,370 B1 | 12/2002 | Belvin et al. | |
| 2007/0029434 A1 | 2/2007 | Rasmussen et al. | |
| 2012/0251823 A1 | 10/2012 | Maldonado et al. | |
| 2012/0263906 A1 | 10/2012 | Ausen et al. | |
| 2020/0023595 A1* | 1/2020 | Pollitt | B29C 70/504 |

FOREIGN PATENT DOCUMENTS

GB    2174419 A    11/1986

OTHER PUBLICATIONS

PCT International Search Report and Written Opinion, Application No. PCT/US2020/046090, dated Feb. 12, 2021.

* cited by examiner

*Primary Examiner* — Matthew J Daniels
(74) *Attorney, Agent, or Firm* — MacMillan, Sobanski & Todd, LLC

(57) ABSTRACT

A simple, cost effective Precision Shaped Tow Manufacturing system can produce high tolerance, dimensionally accurate, ready to use, Unidirectional Resin Impregnated Fiber Tow, Shaped Tow, in one procedure by a single machine that is precise enough to support Automatic Fiber Placement, AFP and Automatic Tape Laying specifications, ATL. The tow shaping system may include a Rotating Forming System, a Static Forming System, or both. A flash cooling chiller is provided to instantaneously set the tow to lock in the shape with a high tolerance.

11 Claims, 4 Drawing Sheets

PRECISION TOW IMPREGNATION MANUFACTURING SYSTEM

REFERENCE TO RELATED APPLICATION

This application claims priority from U.S. Provisional Application Ser. No. 62/886,003, filed Aug. 13, 2019, the disclosures of which are hereby incorporated by reference.

FIELD OF THE INVENTION

This invention generally relates to precision formation of resin impregnated fiber tows.

BACKGROUND OF THE INVENTION

The material currently used in AFP (Automated Fiber Placement) and ATL (Automated Tape Laying) machines requires very tight dimensional tolerances, generally within .001 inch thickness and width. Prior art single process Pre-impregnated Fiber Tow manufacturing machines produce material to a tolerance greater than .01 inches, but this is not sufficient dimensional accuracy for AFP or ATL Machines.

Common prior art practice is to manufacture Unidirectional Prepreg composite in master rolls in industry standard thicknesses and widths and then cut the rolls into tapes of the desired finished width. This obviously involves several steps: (a) the manufacture of master rolls and (b) moving the master rolls to a slitting machine to slit the roll to the required dimension, and (b) winding the slit tows onto a parallel rewinder where it is wound onto a standard fiber spool, in preparation for use in an AFP or ATL machine. This generally doubles the cost of the finished material compared to a single process machine. Thus, there is a need for the present invention.

SUMMARY OF THE INVENTION

The present invention is an apparatus for producing a precision shaped tow. In one embodiment, the apparatus has opposing rollers with one roller having an annular groove and the second roller having an annular ring extending partially into the annular groove to form a shaping space. Hot melt coated fiber is pulled through the shaping space and then instantaneously cooled to lock in the shape. Alternatively, a nozzle system may be used to form the shaping space. The apparatus may be produced as a single machine including a fiber let-off, a resin container, a tow shaping apparatus, and a chiller.

DESCRIPTION OF PREFERRED EMBODIMENTS

Figure 1:
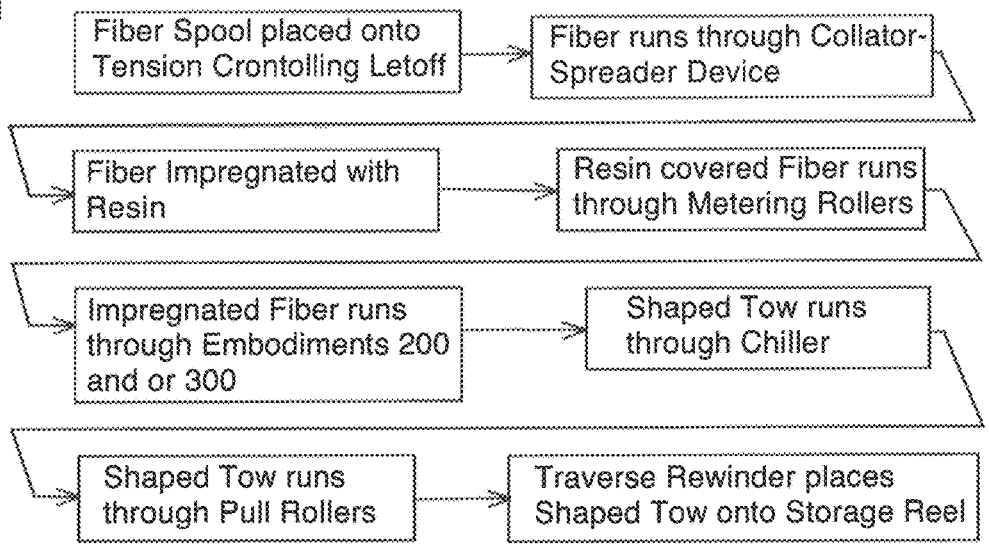
FIG. 1 shows a conceptual flow chart of the Precision Shaped Tow System of the present invention.

Embodiments of a new concept in the precision manufacture of dimensionally accurate Unidirectional Shaped Tow are disclosed. The present invention relates to composite manufacturing and more particularly makes manufacturing more efficient, whereby manufacturers can easily produce their own dimensionally precise Shaped Tow with Fiber and Resin properties of their own specification in a single process on one machine. Shaped Tow is a precision Uni-directional, impregnated Fiber Tow also known as Prepreg or Towpreg material for Automated Fiber Placement, AFP and Automated Tape Laying ATL, machines. It is known to the art that Prepreg is a thermosetting or thermoplastic polymer matrix material.

Three integral Embodiments of the present invention are described in detail. Apparatus 100 is a single process machine that creates precise ready to use Shaped Tow. The components of the machine are mounted on a frame 8 and may be provided as a single machine. Tow shaping system 200 is a sub-system of apparatus 100, consisting of a pair of opposing rollers with one containing one or more rings and one containing one or more groves which interlock and provide Shaping Space 222 that creates Shaped Tow. Shaping system 300 is an alternative system or sub-system of apparatus 100 and consists of one or more conformable nozzles with shaping space 222b that creates Shaped Tow. It is understood that systems 200 or 300 can be used singly, together or in series and in any combination without limitation.

FIG. 1 shows a flow chart of the apparatus and process of the Precision Shaped Tow Manufacturing System of the present invention. The conceptual functional segments are, Fiber Spool placed onto Tension Controlling Let-off, Fiber runs through Collator-Spreader Device, Fiber Impregnated with Resin, Resin covered Fiber runs through Metering Rollers, Impregnated Fiber runs through shaping system 200 and/or 300, Shaped Tow runs through Chiller, Shaped Tow runs through Pull Rollers, Traverse Rewinder places Shaped Tow onto Storage Reel.

FIG. 1 is now described in greater detail. Fiber spool placed onto Tension Controlled Let-off, Spools of specified fiber are placed onto Tension Controlled Let-off devices which control the tension of Fiber release. Typical fibers used to support Shaped Tow are all variants and sizes of carbon fiber, with each fiber or filament generally about 1-2 microns thick. The new low cost fiber variants being developed for infrastructure and automotive, all versions and sizes of fiberglass, aramid, boron are the pre-dominant fibers that can be processed into shaped tow. The shaped tow may have from about 1,000 to about 60,000 fibers or filaments.

Fiber runs through a Collator-Spreader Device that orients the fiber evenly into parallel strands.

Fiber Impregnated with Resin. Collated Fiber is immersed in Resin Application Bath to impregnate Fiber with resin. The disclosed machine and process can support hot melts and thermoplastic resin systems having temperature ranges up to over 1000 F for thermoplastics. It is understood that there are many means to apply resin that are known to the art and all may be used without limitation.

Impregnated fiber runs through Metering Rollers. Metering Rollers control the volume of Resin covering the fibers. Metering rolls can be adjusted to support a range of fiber tows from .001 inch thick to tows well over .125 inches wide or thick.

Impregnated Fiber runs through shaping system 200 and or 300 which control and set the profile, thickness and width of Shaped Tow.

Shaped Tow runs through Chiller. The dimensions produced by the shaping components are set instantaneously by the immediate flash cooling of the resin by the Chiller.

Shaped Tow runs through Pull Rollers. The pull roller assembly provides motive power and controls the speed of Let-off, Collation, Impregnation, Shaping, Cooling and Storage.

Traverse Rewinder places the Shaped Tow onto Storage Reel. A Traverse Rewinder places Shaped Tow onto a Storage Reel or Spool.

Figure 2:
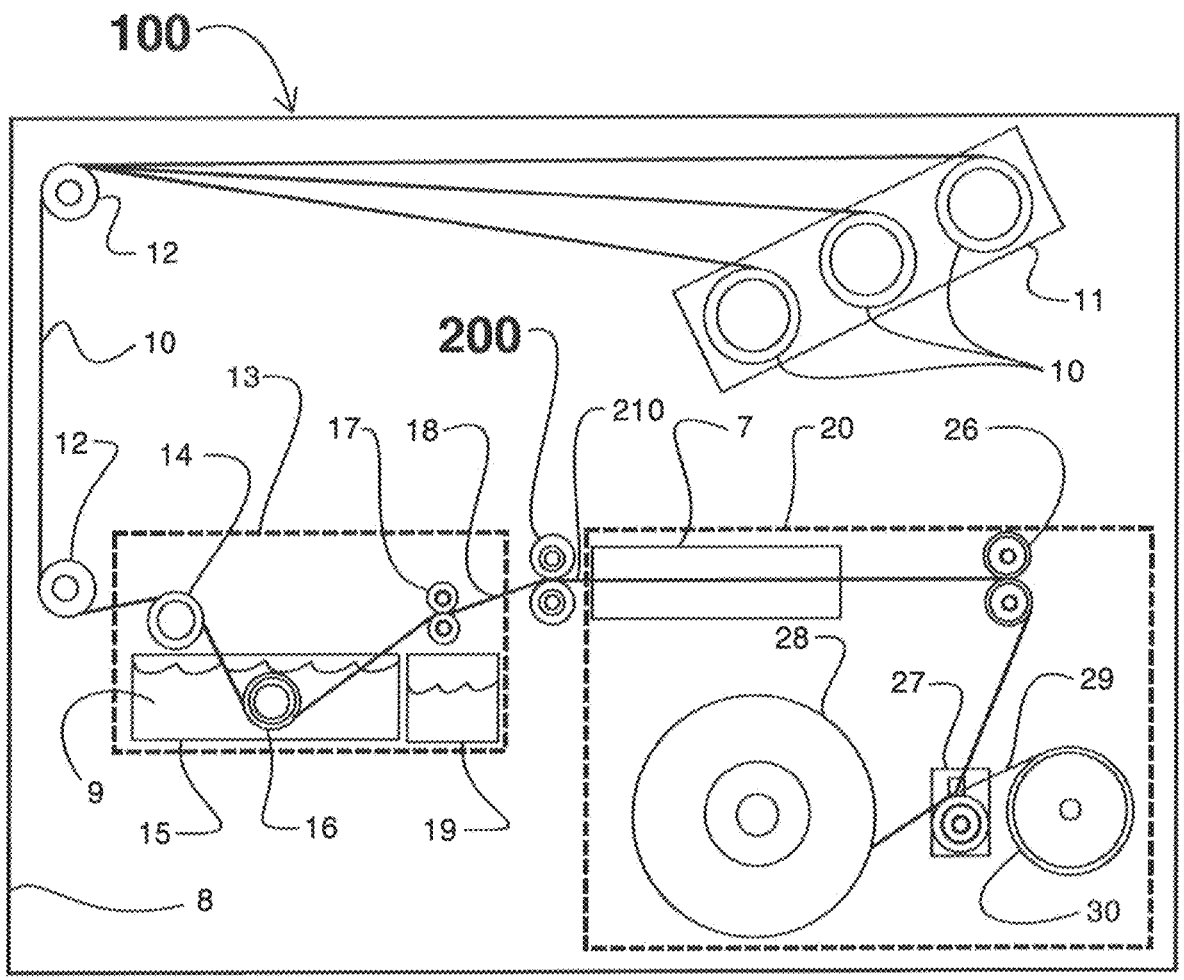
FIG. 2 shows a conceptual drawing of a Precision Shaped Tow Production System Machine of the present invention.

FIG. 2 shows a conceptual drawing of apparatus 100, a Single Process Precision Shaped Tow Production System Machine.

The procedure to produce Shaped Tow begins when the types of Resin 9 and Dry Tow Fiber 10 are specified for a production run. Spools of a desired type of Fiber 10, are placed onto Tension Controlling Let-off 11 which controls the tension of release and prevents overruns. Fiber 10, is directed by Idler Rollers 12, to Impregnation Environment Unit, IEU 13. IEU 13 is a semi sealed, insulated, temperature controlled area. It is known to the art that Resins for the Prepreg process need to be accurately kept within a specified working temperature range and vapors and outgassing need to be controlled. Working ranges from Room temperature up to over 1000 F. IEU 13 can have one or more heat sources, not shown, as is well known in the art.

The first process in IEU 13 is to collate Fiber 10 into parallel strands by Spreader-Collator Device 14. Then Fiber 10 is directed into Resin Bath 15 by Immersion Roller 16. It can be seen that Immersion Roller 16 directs the path of Fiber 10 into and out of the Resin Bath 15 where resin coating of fiber 10 takes place. Resin Impregnation Bath 15 is shown but it is understood that Fiber 10 can be coated or impregnated by direct application by resin pump, hot melt, or any process known to the art without limitation. The disclosed system and machine is particularly useful with hotmelt and thermoplastics.

Resin 9 in Resin Bath 15 can be any type or system of any type Prepreg resin known to the art without limitation. The temperature of Resin Bath 15 can influence the viscosity and saturation of Fiber 10 by Resin 9. Acceptable temperature ranges up to 1000 F or more. Pairs of metering Rollers 17 control the desired ratio of Resin to Fiber 10.

Depending on the application, a typical resin to fiber thickness ratio is .25 to .50 resin content. Excess Resin, falls into Used Resin Container 19. Metering rollers 17 create Resin impregnated fiber 18, which is not precisely shaped. Resin-fiber 18 runs at an upward angle under tension provided by Let-off 11 into shaping system 200 or 300 which transform Resin fiber 18 into Shaped Tow 210.

Coated fiber 18 has an upward feed angle. However, the feed angle may be flat or even downward into groove 24, without limitation. If the feed angle is reversed to a downward direction, system 200 can be configured such that Resin-fiber 18 can run at the downward angle into one or more grooves of an upper Roller with one or more grooves and an opposed lower roller with one or more protruding rings creating shaping space 222 and provide the same results as with an upward feed angle, without limitation.

The Shaped Tow 210 now enters Chiller 7 in the insulated Finishing Unit, IFU, 20. IFU 20 is a semi-sealed, insulated, temperature controlled area. When the Pre-Preg Resins and fiber are chilled to a predetermined temperature for a predetermined time they become dimensionally and catalytically stable for until heated to a curing temperature for a specified time.

The chiller 7 is critical to producing the high tolerance tow as required by certain AFP and ATL applications. The chiller 7 may utilize liquid nitrogen, carbon dioxide, or a similar super cooled liquid (at temperatures from about 0 degrees Fahrenheit to about 365 degrees Fahrenheit below zero) to instantaneously freeze the tow and lock the tow shape to preserve the tight tolerance produced by the IEU 13. Any chilled gas that does not leave contamination or residue on the tow may be used in the chiller, including chilled air. A highly accurate dimensional tolerance within plus or minus about .005 inches is achievable.

The dimensionally stable Shaped Tow 210 continues to Pull Rollers 26. Pull Rollers 26 provide motive power and control the speed of Let-off, Collation, Impregnation, Shaping and Cooling of the Shaped Tow 210. Traverse Rewinder 27 places Shaped Tow 210 onto Storage Reel 28 with Release Material 29 from Release Material Let-off 30. The Shaped Tow 210, and all Pre-preg materials are somewhat sticky because resin 1 is uncured, Release Material 26 prevents Shaped Tow 210 from sticking to itself. IFU 20 keeps Storage reel 28 of Shaped Tow at a predetermined storage temperature below 45 F and as low as 0 F.

All components identified in FIG. 2 are mounted directly or indirectly on a mounting frame 8 to provide a single process machine.

Figure 3:
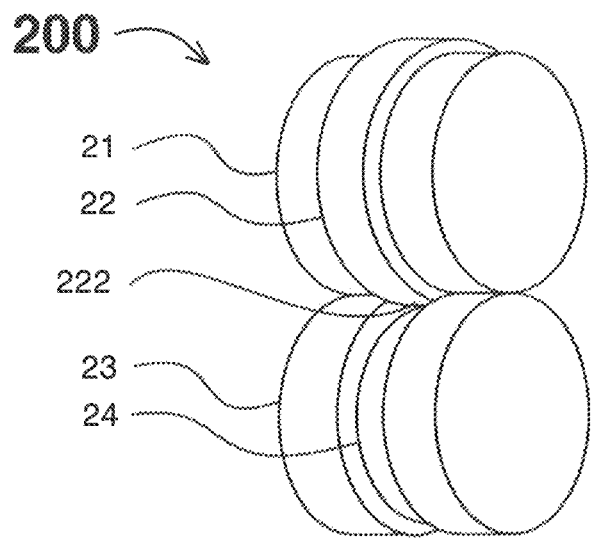
FIG. 3 shows a perspective view of the opposing rollers 21 and 23, and interlocking ring 22 and groove 24 and shaping space 222 of FIG. 2.
Figure 4:
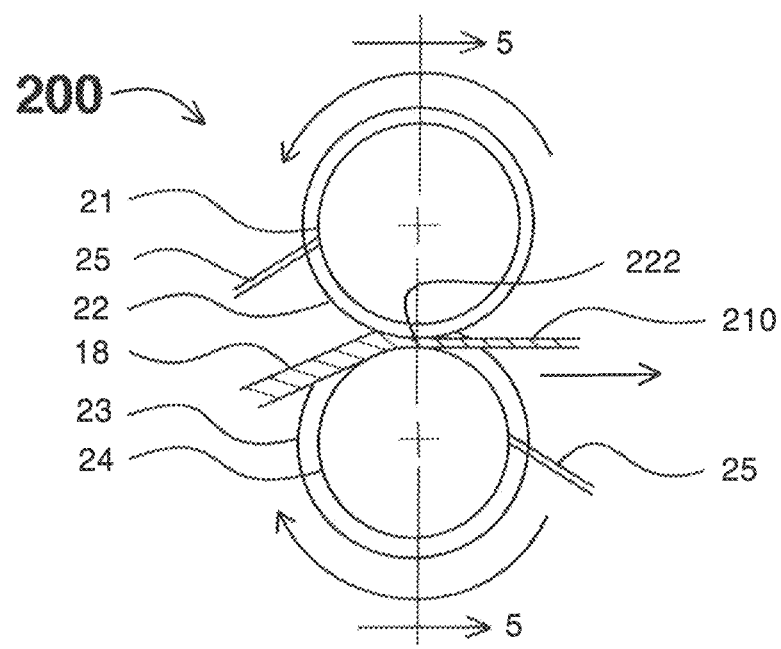
FIG. 4 shows a view of the opposing rollers of Fig. 3 with ring and groove-creating Shaped Tow with cleaning scrapers.
Figure 5:
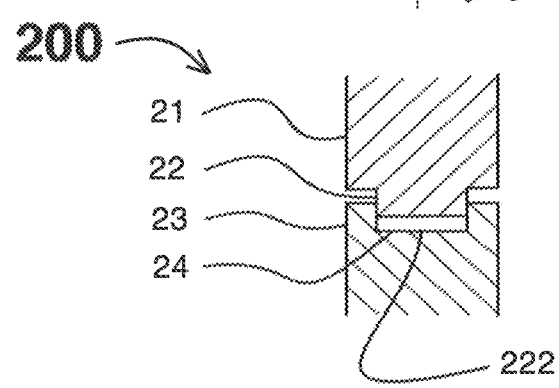
FIG. 5 shows a sectional view of the ring and groove along line 5-5 of FIG. 5.

FIGS. 3, 4 and 5 show shaping system 200 having rotatable opposing rollers 21 and 23, and interlocking ring 22 and groove 24 and shaping space 222, one roller having a groove 24 and another roller having an opposing interlocking ring 22. The interlocking ring 22 and groove 24 create a shaping space 222 between them. The space 222 may be of varying dimensions. Common tow widths are 0.125, 0.250, and 0.500 inches. The disclosed system and machine is particularly useful in producing high tolerance 0.125 inch tows for AFP applications.

FIG. 5 shows that shaping space 222 has a fixed width but by variation of the distance between rollers 21 and 23, Shaped Tow of varying thickness can be produced.

Figure 6:
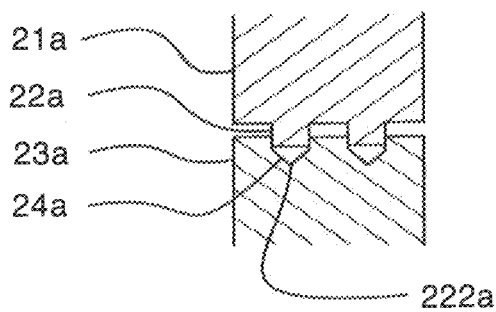
FIG. 6 shows a sectional view of an alternative embodiment of the opposing rollers having multiple rings and grooves and a variant profile of shaping space.

FIG. 6 shows embodiment 200a having opposing rollers with multiple rings and grooves showing a variant profile of shaping space 222a. It can be seen that generally shaping space 222a has a fixed width but by variation of the distance between rollers 21a and 23a, Shaped Tow of varying thickness can be produced.

The shaping systems 200 and 200a include a pair of rotating opposing rollers, wherein one roller has one or more protruding annular rings 22, 22a, and one other roller has one or more annular grooves 24, 24a which interlock. The interlocking rings and grooves are so designed to create a compressing and shaping space 222, 222a between them, such that when resin covered fiber 18, passes through the Shaping space 222, 222a, the fiber is formed into a desired dimension and profile creating Shaped Tow 210. The shaping space or spaces 222, 222a can be configured in height, width and profile, without limitation.

The rollers can be heated or cooled by any means know to the art such as radiant, contact, convection, not shown, without limitation and be actively or statically coated with a release agent or material, to facilitate production and cleaning such as Teflon, wax, mold release, vapor or plasma spray applications, not shown, and each roller may each have one or more scrapers 25, to remove excess resin and direct it to a catch basin, not shown.

By increasing or decreasing the distance between the ring 22 and groove 24, shaped tow 210 of the same width and profile but of varying thicknesses can be produced. The distance between opposed rollers 21 and 23 can be controlled by pneumatic, electrical or mechanical means, not shown, opposing rollers 24 and 22, can rotate passively by the pulling motion of resin-fiber 18 or actively by drive motors, not shown, or, or not in synchronization with pull rollers 28, without limitation.

Opposing surfaces of groove 22 and ring 24, creating shaping space 222 can be profiled to provide many combinations and variations of shapes required by industry such as oblong flat, square, round, diamond, grooved or any combination without limitation, to produce Shaped Tow for any application known or as yet unknown to the art.

Let-off devices provide tension that is necessary to prevent overruns and keep impregnated fiber 18 in female groove 24 of the lower shaping roller 23, without limitation.

Rollers can provide Aerospace grade dimensionally stable Shaped Tow on a production basis with one machine and one procedure to within .005 of an inch, without limitation.

Figure 7:
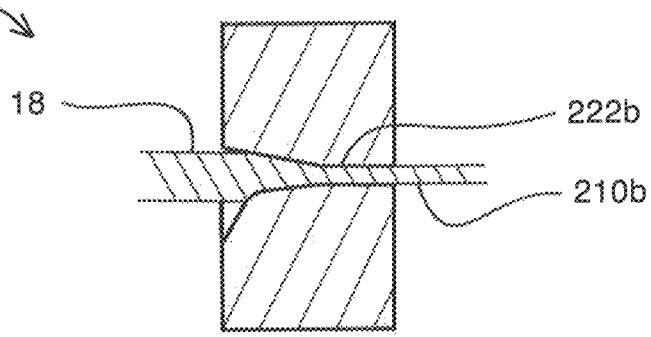
FIG. 7 shows a sectional view of an alternative nozzle for shaping Resin impregnated fiber.

Referring to FIG. 7, monolithic nozzle die 300 can be a sub part of apparatus 100 that can produce Shaped Tow from resin fiber.

As Resin fiber 18 is pulled through the Shaping Space 222b, the fiber 18 is compressed and formed into Shaped Tow 210b, as in Embodiment 100 and FIGS. 1 and 2. Either of system 200 or 300 can provide Shaped Tow precise enough to support AFP and ATL specifications.

Figure 8:
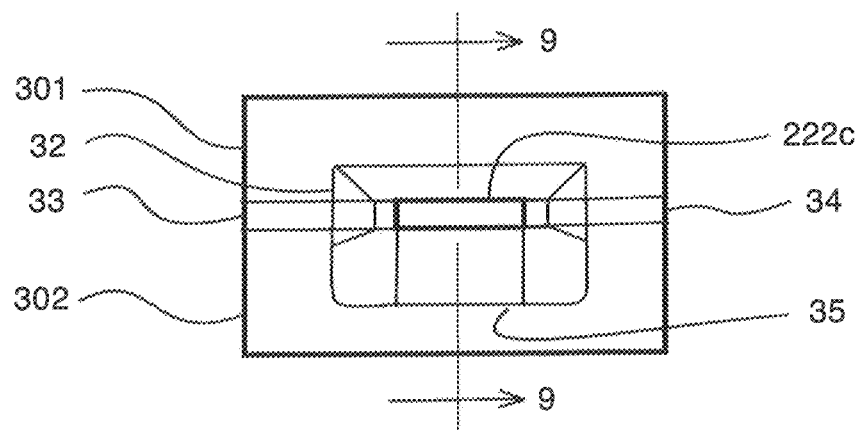
FIG. 8 shows a front view of the nozzle of FIG. 6.
Figure 9:
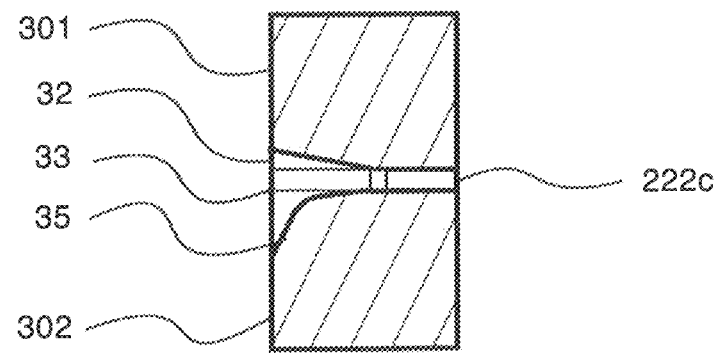
FIG. 9 shows a sectional side view the nozzle of FIG. 8 taken along line 9-9 of FIG. 8.

Referring to FIGS. 8 and 9, nozzle system 300c can be a conformable nozzle die including Nozzle Die Body Upper 301, Nozzle Die Body Lower 302, Nozzle 32, Nozzle Die Excess Resin Channel 35, Nozzle Die Dimension Shim Left 33, Nozzle Die Dimension Shim Right 34, and Shaping Space 222c.

Figure 10:
FIG. 10 shows plan and side views of left and right shims of FIG. 8.
Figure 11:
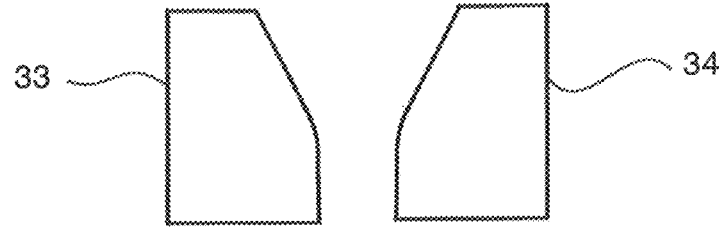
FIG. 11 shows top view of left and right Nozzle Die Shims of FIG. 10.

Nozzle system 300c may have one or more shim sets, shown in FIGS. 10 and 11, which bisect the nozzle body in the horizontal plane. Nozzle system 300c may also have one or more shim sets which bisect its body in the vertical plane, not shown, and allow the production of Shaped Tow of variations of thicknesses and or widths with the same die body, without limitation. Nozzle 32 can be of any profile or shape required by need or know to the art, without limitation. Nozzle system 300c has an Excess Resin Channel 35 which allows excess resin to drop into Excess Resin Tank 19 of apparatus 100. Nozzle system includes a nozzle die that compresses impregnated tow 18 into Shaped Tow 210.

FIG. 10 shows a Front View of Nozzle Die Dimension Shim Left 33 and Right 34. These shims may have any thickness desired to produce a desired tow thickness. FIG. 11 shows top view of Nozzle Die Dimension Shim Left 33 and Right 34

Figure 12:
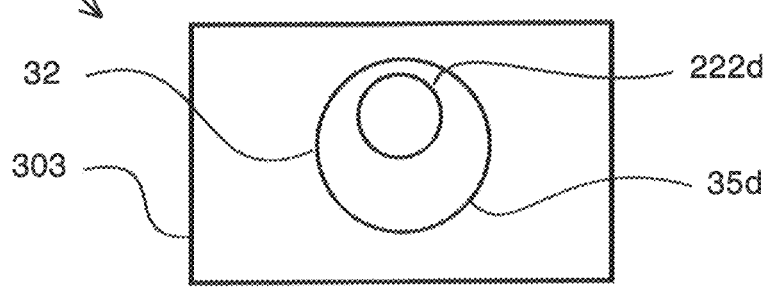
FIG. 12 shows a conceptual front View drawing of an alternative monolithic block nozzle die having a variant shape capable of producing round Shaped Tow of varying diameters.

Referring to FIG. 12, alternative nozzle system 300d is a nozzle die, as a monolithic block, capable of producing round Shaped Tow. Varying diameters having nozzle 32, and excess Resin Channel 35d. As with system 200, resin fiber is precisely formed into Shaped Tow. Immediately upon its exit from system 300, 300c, or 300d, the Shaped Tow is chilled to "freeze" its dimensions in Chiller 7.

Nozzle system 300c may be configured with variations of both horizontal and vertical Nozzle Die Dimension Shims, vertical Dimension shims not shown, that without limitation, to allow a range of thicknesses and widths to be produced.

With one or more horizontal and or vertical Nozzles and or Dimension Shims, and that Shims, and Vertical Nozzles may be adjusted to increase or decrease shaping space 222c by one or more mechanical and/or motorized devices without limitation.

Apparatus of the present invention with any of the disclosed shaping systems can be configured to produce Shaped Tow of one or more profiles, thickness and widths without limitation.

Apparatus of the present invention can be temperature controlled by one or more internal contact heaters or external radiant, convection or contact heaters, know to the art. The shaping rollers and nozzle may be heated or cooled for particular applications, such as with thermoplastics.

Nozzle 300 may be configured as a solid or split block of material which can be metal, composite, Teflon, without limitation and may be coated with Teflon or other release materials known to the art, without limitation. Nozzle system 300c may have one or more Orifices 32.

The apparatus of the present invention may include parts that may include automated adjustment methods such as servo motor driven, mechanically adjusted Nozzle Die variations without limitation.

The disclosed Precision Shaped Tow Manufacturing System can provide dimensionally stable Shaped Tow on a production basis with one machine and one procedure to within .005 of an inch, without limitation.

Resin Baths are disclosed herein but other methods of applying Resin 9 to Fiber 10 can include, spraying, dripping, injection, metering, contact application, one side filming, direct dispersion, powder dispersion and/or any method currently known to the art, without limitation.

All concepts and disclosures herein described disclose a simple, cost effective system that produces dimensionally accurate, ready to use, Pre-impregnated Shaped Tow composite in one procedure by one machine that is precise enough to support AFP and ATL specifications, without limitation. the tow shaping systems disclosed herein provide a more economical and relatively high speed process than exists in current art.

The terms Fiber, Dry Tow, Impregnated Fiber, Prepreg, Impregnated Tow, TowPreg, etc. are terms that are known to the art and all relate to types of manmade fibers known as carbon, Graphite, Aramid, Fiberglass, etc. and their state which can be dry or impregnated. The term Shaped Tow is a specific term used to describe the product made by the embodiments of the present invention disclosed herein.

The preceding disclosure is exemplary and conceptual in nature and without limitation.

What is claimed is:

1. An apparatus for producing a precision shaped tow, the apparatus comprising a precision tow shaping device, the precision tow shaping device comprises first and second opposing rollers, the first roller having an annular groove, the second roller having an annular ring, a portion of the annular ring extending partially into the annular groove, and a chiller next adjacent the tow shaping device, the apparatus further comprising a frame, wherein the tow shaping device and the chiller are mounted on the frame, and further comprising an insulated finishing unit mounted on the frame.

2. The apparatus defined in claim 1 wherein the chiller is capable of reducing the temperature of a tow to zero degrees Fahrenheit within one second.

3. The apparatus defined in claim 1 wherein the insulated finishing unit includes a storage reel for storing the tow at temperatures of 45 degrees Fahrenheit or below.

4. The apparatus defined in claim 1 wherein a portion of the annular ring extends partially into the annular groove, whereby a generally rectangular shaping space is created between the annular groove and the annular ring.

5. The apparatus defined in claim 1 wherein the widths of the annular groove and the annular ring are substantially equal.

6. The apparatus defined in claim 5 wherein the annular groove has parallel side walls and the annular ring has parallel side walls.

7. The apparatus defined in claim 1 further comprising a die having a precision shaped opening.

8. The apparatus defined in claim 7 wherein the die is monolithic.

9. The apparatus defined in claim 7 wherein the die comprises opposing die members.

10. The apparatus defined in claim 9 wherein the die further comprises a shim between the opposing die members, the shim defining a boundary of the opening and the height of the opening.

11. The apparatus defined in claim 1 further comprising a die in series with the rollers.

\* \* \* \* \*